Dec. 1, 1936.                J. W. HOBBS                2,062,883
                        ILLUMINATED INSTRUMENT DIAL
                           Filed Oct. 22, 1934
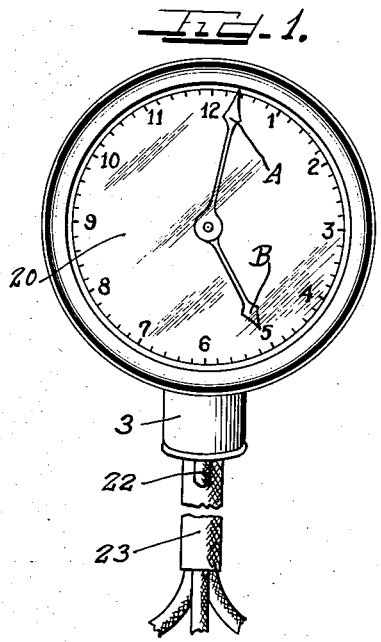
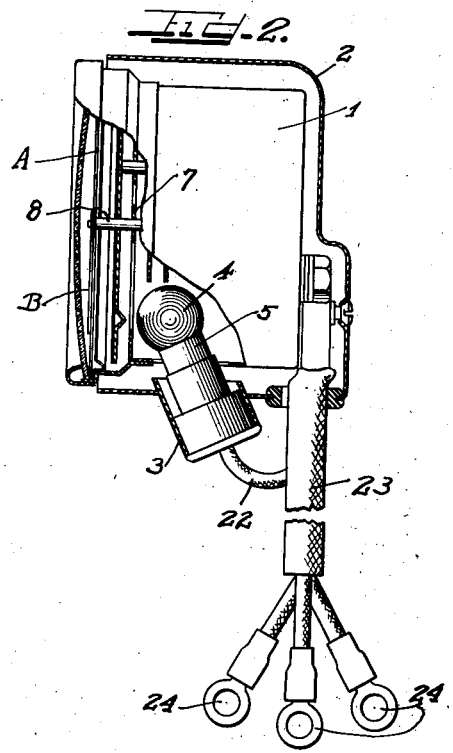
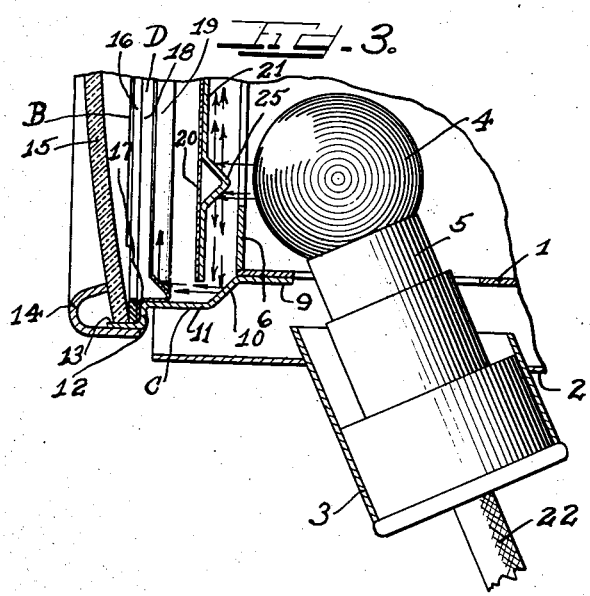
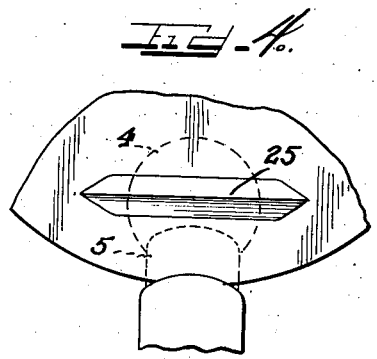
Inventor
John W. Hobbs.
by Charles H. Hills Attys.

Patented Dec. 1, 1936

2,062,883

UNITED STATES PATENT OFFICE 2,062,883

ILLUMINATED INSTRUMENT DIAL

John W. Hobbs, Chicago, Ill., assignor to George W. Borg Corporation, Chicago, Ill., a corporation of Illinois Application October 22, 1934, Serial No. 749,348

4 Claims. (Cl. 240—2.1)

The present invention relates to an illuminated instrument dial and will be herein described as an illuminated clock dial although, of course, the invention is not limited to a clock dial as it is susceptible of use with other surfaces.

The present invention is directed to the illumination of instrument dials, preferably such instruments as are used on automotive vehicles wherein it is necessary that the dials be sufficiently illuminated for proper visibility and yet illuminated in such manner as not to cause glare and thus be objectionable.

It is further desirable that such instrument dials be illuminated with diffused light so as not to interfere with the operation of a motor vehicle when such dial or surface is illuminated and used as a part of the equipment of such vehicle.

An object of the present invention is to provide an illuminated surface wherein sufficient illumination is provided without glare.

Another object of the present invention has to do with the provision of an illuminated instrument dial wherein the dial is illuminated by reflected light from a source concealed from view.

A further object of the present invention is to illuminate instrument dials and other surfaces, indirectly, by light rays which emanate from a concealed light source and which are directed across the dial along a path provided with reflecting surfaces whereby the light rays travel along a path containing a plurality of angular reflectors between the light source and the dial.

Generally speaking, the invention contemplates a dial or other surface which is opaque or which is backed by opaque material, the provision of a light source adjacent the unexposed surface of the dial, and the provision of a series of reflecting surfaces so that the issuing light rays pass through an angular path from the source to the dial surface first in a direction parallel to the surface, then in a direction perpendicular to it and across its margin and then angularly against the dial, whereby a pleasing diffused illumination of the dial is achieved.

The above other and further objects of the present invention will be apparent from the following description, accompanying drawing and appended claims.

The accompanying drawing illustrates an embodiment of the present invention and the views thereof are as follows:

Figure 1 is a view of a clock dial illuminated in accordance with the principles of the present invention.

Figure 2 is a view partially in section, and partially in elevation, with parts broken away, through the structure of Figure 1 and showing certain details of construction and arrangement.

Figure 3 is a fragmental enlarged sectional view of the illustrated embodiment of the present invention, same being an enlargement of the lower left hand corner of Figure 2.

Figure 4 is an enlarged fragmental view of a portion of the under or reverse side of a dial, showing in dotted lines the relation of the light source thereto, and showing a form of reflector disposed adjacent the light source.

The drawing will now be explained.

While the present invention has been herein explained in connection with an illuminated clock dial, it is to be understood that the invention is not limited to a clock.

As the clock mechanism forms no part of the present invention, it will not be described or illustrated.

A casing 1, substantially cylindrical, in the main, is provided for containing the usual clock mechanism not shown. The casing 1 is shown as enclosed in a housing 2 to which the casing may be attached in any suitable manner. A socket 3 is secured in the housing 1 and supports a light bulb 4 having a hub 5 which is removably secured within the socket 3 in the usual manner. The casing 1 is apertured to receive the bulb 4 as illustrated in the drawing.

A construction of the illustrated apparatus is such that the bulb 4 is disposed within the casing 1 so as not to interfere with the clock mechanism therein contained.

A partition 6, which is in the form of a ring and has an annular portion adjacent its outer periphery, is formed as a part of, or constitutes a part of the casing 1 adjacent the dial end of the casing. The ring 6 is illustrated as having a central hub portion 7 to surround and support the spindle 8 through which the hands A and B are moved. Surrounding the casing 1, adjacent the dial end thereof, is a hoop designated generally as C and having a flange 9 adapted to engage about the casing 1 with an outwardly flared inclined portion 10, making substantially a forty-five degree angle with the part 9, then with a part 11 substantially parallel to the part 9 but radially spaced therefrom by reason of the inclined part 10, outwardly of which is a substantially right angular shelf or ledge 12 serving as a seat for the crystal. The hoop member terminates in a flange 13 which extends in the same general direction as the parts 9 and 11 of the hoop.

A bezel 14 is applied over the portion 13 of the hoop to secure in place the usual crystal 15 and washer 16.

A ring member D somewhat Z-shaped in section is shown as disposed between the washer 16 and the seat 12 formed in the hoop C. The ring D has a flange portion 17 which is clamped between the washer 16 and the seat 12, a web 18 and a flange 19. The flanges 17 and 19 extend in opposite directions with respect to the web 18. The flange 17 is substantially perpendicular to the web 18 while the flange 19 is bent at an acute angle to the web 18. As the member D is assembled the bent flange 19 constitutes a reflector or reflecting surface and is bent in substantially a forty-five degree angle to the web 18.

Supported between the ring 6 and the ring D is a dial 20 bearing, in the present instance, the figures usually accompanying a clock dial. The dial is made preferably of opaque material and is finished with its rear or unexposed surface painted white or other color suitable for reflecting purposes. The exposed face is preferably painted white with the figures in black for contrast. The dial 20 is supported with its margin spaced inwardly from the hoop C. As the hoop is constructed, the portions 11 thereof are opposite the margins of the dial, with the inclined portions 10 between the dial and the ring 6.

Secured to the unexposed or rear surface of the dial is a plate 21 having formed in it, as by pressing, a ridge 25 which is V-shaped in section. The plate is applied to the unexposed or rear side of the dial in such manner that the apex of the ridge is substantially in line with the light source of the light bulb 4. The ridge 25 is so disposed with reference to the inclined portion 10 of the hoop C as to constitute reflecting surfaces for reflecting the light rays emanating from the light source or bulb 4 in directions parallel to the dial and along its rear or unexposed surface and against the inclined reflecting portion 10 of the hoop C.

The light rays emanating from the source of bulb 4 strike the ridge 25 and are reflected therefrom at substantially 90° along and in the direction of the dial. The light rays then strike the inclined reflecting surfaces 10 at a 45° angle and are then reflected in directions perpendicular to the plane of the dial and across the margin of the dial against the reflector 19 of the ring D. The disposition of the reflector 19 is such as to direct the light rays across the dial 20 parallel thereto, or at a very light slight angle, to illuminate the dial without glare.

It will be observed that the reflecting surfaces 10 and 19 are arranged at 45° angles to the intermediate reflecting surface 11, so that the light is bent around the margin of the dial 20 in the general direction of the arrows shown in Fig. 3.

The ring 6 extends inwardly from its margin a sufficient distance to prevent light rays from the source or bulb 4 from passing directly beyond the adjacent margin of the dial without being first reflected from the ridge 22, in the manner heretofore described.

The hands A and B are disposed on the spindle 8 outwardly of the reflector of flange 19, so that the light is directed against the dial between the dial and the hands, thus increasing the effectiveness of the illumination.

It will be observed that the light rays emanating from the source or bulb 4 reach the exposed face of the dial by a series of angular bends from all radial directions so that the intensity of the light is reflected across the face of the dial without the creation of shadows and without too great loss of luminosity.

A conductor 22 connects with the socket 3 for supplying electrical energy to the light source or bulb 4. The conductor 22 is illustrated as part of a cable 23 having a plurality of terminals 24 for connection to suitable electrical binding posts.

The clock herein illustrated is preferably an electrically operated clock, the electrical energy being supplied through the cable to suitable clock mechanism not shown.

In the event the dial is small, then the hoop C might not have the several reflecting surfaces arranged in the manner illustrated. It is essential, however, that sufficient space between the dial margin and hoop be provided to allow the reflected rays to pass across the dial margin.

The several reflecting surfaces are preferably painted white to increase reflection.

The invention has been described herein more or less precisely as to details, yet it is to be understood that the invention is not limited thereby, as changes may be made in the arrangement and proportion of parts, and equivalents may be substituted, without departing from the spirit and scope of the invention.

The invention is claimed as follows:

1. A casing, a light source comprising an electric bulb in said casing, a dial in said casing and having its peripheral edge in spaced relation to the adjacent wall of the casing to define a slot around said dial for the passage of light past said edge, said dial being positioned in front of said bulb and in spaced relation thereto, a reflecting member positioned between said dial and said bulb, said reflecting member having rearwardly converging sides with the apex of the reflector in spaced opposed relation to said bulb, and being adapted to reflect light in a vertical direction towards the periphery of said dial, and reflecting means disposed about and in spaced relation to the peripheral edge of said dial to direct light from said reflecting member to the front face of said dial.

2. A casing, a vertically extending dial in said casing and having its peripheral edge in spaced relation to the adjacent wall of the casing to define a slot around said dial for the passage of light past said edge, a light bulb in said casing in spaced relation to and at the rear of said dial, reflecting means on the rear of said dial and having reflecting faces converging towards said bulb, and means disposed about and in spaced relation to the peripheral edge of said dial to direct light from said reflecting member to the front face of said dial.

3. A casing, a circular dial in said casing and disposed with its peripheral edge in spaced relation to said casing to provide therewith an annular slot for the passage of light, a light bulb in said casing in spaced relation to and at the rear of said dial, a glass closure member at the front end of said casing, and means cooperating with said bulb and said slot to illuminate the front of said dial, said means including a ring positioned between said glass and said dial and having an annular and rearwardly extending portion with a reflecting surface inclined at an angle of substantially 45 degrees towards said dial, and extending beyond the periphery of said dial.

4. A casing, a dial in said casing and disposed with its peripheral edge in spaced relation to said casing to provide therewith a slot extending around said dial for the passage of light, a light bulb in said casing in spaced relation to and at the rear of said dial, a transparent closure member at the front end of said casing, and means cooperating with said bulb and said slot to illuminate the front of said dial, said means including a frame positioned between said closure member and said dial and having a rearwardly extending substantially continuous portion with a reflecting surface inclined at an angle and in spaced inclined opposed relation to said slot to receive light passing through the slot and reflect the light to the dial in a direction normal to the slot.

JOHN W. HOBBS.